March 12, 1940.  A. A. BLUE  2,193,388
SPEED INDICATING DEVICE
Filed Oct. 7, 1935  3 Sheets-Sheet 1
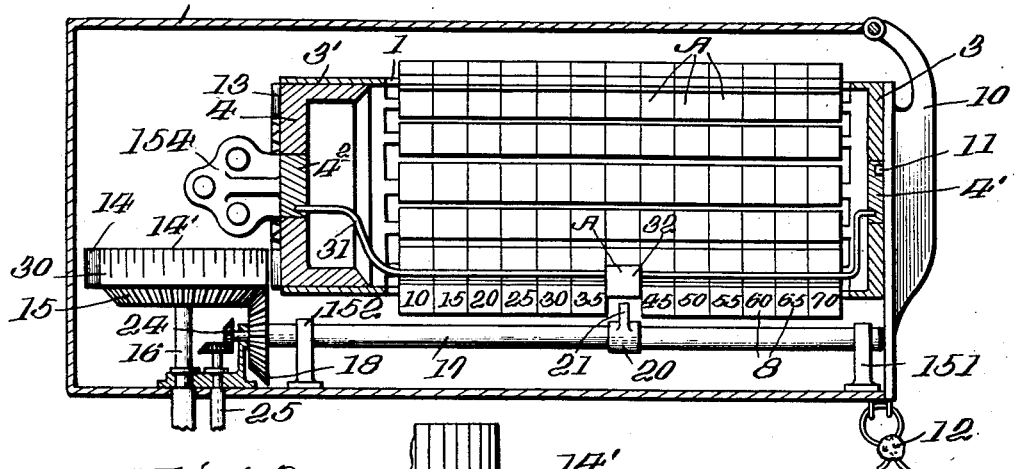
Inventor
A. A. Blue
By Patterson, Wright & Patterson
Attorneys March 12, 1940.  A. A. BLUE  2,193,388
SPEED INDICATING DEVICE
Filed Oct. 7, 1935   3 Sheets-Sheet 2
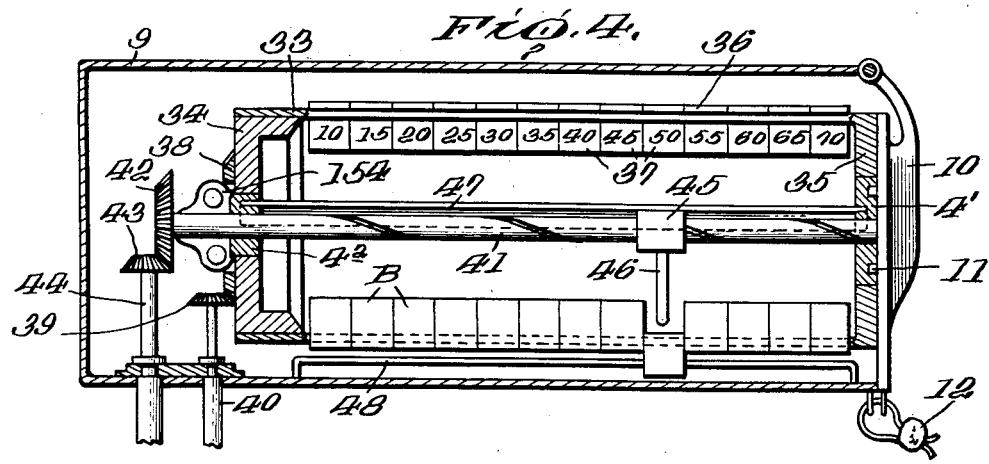
Inventor
a. a. Blue
By Patterson, Wright & Pattison
Attorneys March 12, 1940.   A. A. BLUE   2,193,388
SPEED INDICATING DEVICE
Filed Oct. 7, 1935   3 Sheets-Sheet 3
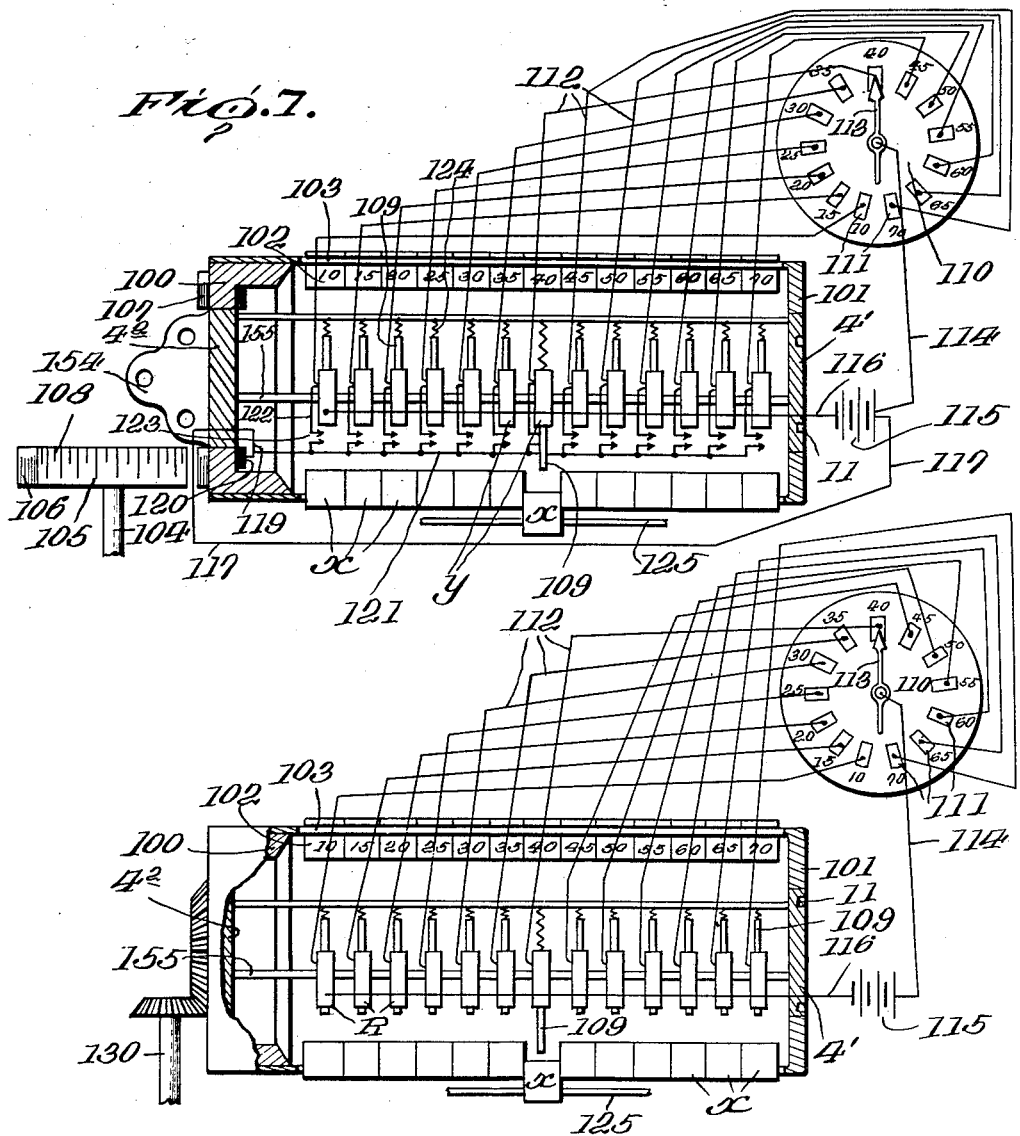

Patented Mar. 12, 1940

2,193,388

UNITED STATES PATENT OFFICE 2,193,388

SPEED INDICATING DEVICE

Arthur Ayling Blue, Sewickley, Pa.

Application October 7, 1935, Serial No. 43,968

12 Claims. (Cl. 264—1)

This invention relates to an improved indicating device being more specifically directed to what I have termed a recording speedometer in that the device records the speed of travel of a vehicle throughout the travel of said vehicle over a predetermined distance.

It is at the present time being generally recognized that excessive speed of vehicles, particularly automobiles, is not only dangerous but is the chief cause of automobile accidents. It is of course common knowledge that many automobile drivers drive their cars at excessive speeds, and it is equally well recognized that it is not only exceedingly difficult but practically impossible to enforce the speed laws now in force in the several States.

It is difficult to prove that a driver was exceeding the speed limit or prove the speed of the driver at the time of an accident. Under present conditions proof of excessive speeds under either of the above circumstances can only be obtained by a traffic officer such as a policeman, actually trailing the offending driver. This manner of proof is not only cumbersome but for the most part is generally ineffective for the reason that the driver, upon the appearance of the officer, slows down.

The present invention is therefore conceived to provide an automatic recording speedometer for recording the speed of the vehicle throughout all parts of the distance traveled by said vehicle, and the device can be used by the policeman or other law enforcement officers in establishing the violation of speed laws and in actually proving the speed of travel not only at the time of an accident but immediately prior to the actual occurrence of the accident.

To prevent the device from being cumbersome and therefore objectionable as to size and other respects, it is believed that if the device records speeds over a stated distance, for example two miles and then progressively clears the record as the device records the next two miles of travel of the vehicle, such a device will meet and solve practical conditions of automobile use today. It is to be understood of course that the device can be made to record greater or less elapsed distances should it be found desirable to do so.

In use it is intended that the recorder be sealed within a housing and that in the event of an automobile driver being stopped for violation of the speed limit or that knowledge of the speed of the driver at the time of an accident be desired, the seal of the housing is broken by the law enforcement officer and the record retained by him for production in court.

I have found that the recording of speed of a vehicle throughout given predetermined or elapsed distances can be secured or obtained in various ways. The mechanisms hereinafter illustrated and described can be divided up into three classifications, viz., recording (1) through intermittent rotation of a cage or carrier upon which is recorded the speed, such as appears in Figures 1 to 3 and 7 of the drawings; (2) through continuous rotation of a cage or carrier upon which is recorded the speed, such as appears in Figures 4 to 6, and 8 of the drawings. Several mechanisms for accomplishing the desired result under the above classifications are illustrated in the accompanying drawings and described in the following specification, but it is to be understood that the desired results could be obtained by other specific devices without departing from the spirit of the invention set forth in the accompanying claims. Accordingly the accompanying drawings are merely illustrative of several examples of the physical embodiment of the present invention constructed according to the best modes so far devised by me for the practical application of the principles of the invention.

From the foregoing it will therefore be obvious that the primary object of the invention is the provision of an improved recorder for progressively recording the speed of a vehicle throughout predetermined distances of travel.

Other specific objects and novel features of the invention, such as means for progressively clearing the record or recorder and the specific constructional mechanisms for accomplishing the desired results, will appear in more detail from an inspection of the accompanying drawings when read in the light of the following description.

In the drawings:

Figure 1 is a vertical longitudinal sectional view through a recorder embodying one mechanical form of the present invention.

Fig. 2 is a detail view, partly in vertical cross section, illustrating the manner in which the indicators of the recorder are actuated.

Fig. 3 is a fragmentary view in vertical longitudinal section illustrating the manner in which the indicator actuating finger is driven.

Fig. 4 is a longitudinal vertical sectional view through a modified form of recorder.

Fig. 5 is a vertical sectional view taken at right angles to Figure 4.

Fig. 6 is an elevational view of the cage carrying the recording indicators.

Fig. 7 is a longitudinal vertical sectional view through a still further modified form of the invention in which the actuation of the speed indicators is accomplished by electrical force.

Fig. 8 is a longitudinal vertical sectional view of a modification of the form of the invention illustrated in Figure 7 of the drawings.

In the accompanying drawings, which clearly illustrate the several methods of accomplishing the desired results, the invention is illustrated diagrammatically to a certain extent, but clearly discloses the several mechanisms by which a continuous speed record is obtained.

Having reference now to those drawings, and particularly Figures 1 to 3 inclusive, I illustrates a cylindrical cage made up of a plurality of longitudinally extending ovate shaped wires or rods 2, see Fig. 2, arranged in separated parallel relationship and suitably secured at their ends to a disc 3 and ring 3'. The ring 3' has driving and supporting connection with a carrier disc 4. The discs 3 and 4 are provided centrally with bearings 4' and 4². The rods support a plurality of indicators designated generally by A in the manner indicated specifically in Figure 2 of the drawings. These indicators are L-shaped and each of them is provided with a spring clip 5 provided with a notch 6. Normally these indicators are held by the spring in the position indicated in Figure 2, but in the event any indicator is moved about its supporting rod it will flop over ninety degrees.

The design and shape of the spring and the rod is such that a small movement of the indicator will cause it to flop over or around ninety degrees as mentioned. In their normal positions the legs 7 of the indicators project outwardly from the cage. The faces 8 of the indicators carry designations to indicate speeds in the terms of miles per hour. These indicators are arranged as clearly appears in Figure 1 so that there are a series of parallel rows of longitudinal indicators and also a series of vertically disposed parallel rows of indicators. Considering Fig. 1 from left to right it will be seen that the first row of indicators carry the numeral 10 which would indicate ten miles per hour; the next row, 15, and the next row 20, and so on up until 70. Each indicator in the first vertical row would carry the numeral 10 and each indicator in the second vertical row the numeral 15, and so on throughout the length of the cage or cylinder.

This cage carrying the indicators is mounted for rotation within a housing 9. The disc 3 at the right end of the housing is suitably rotatably supported in a bearing 4', which bearing is in turn supported by the housing end door 10, as clearly indicated at 11. The bearing 4² rotatably supports the left end of the cage and is itself supported from the housing 9 by a bracket 154. The cage is removable through the door 10, which door is normally held closed by a suitable seal 12, which seal is broken by the law enforcement officer at any time he may desire to remove, for court use, the cage carrying the record.

On the outer face of the disc 4 at the left end of the cage a ring gear 13 is provided and has driving engagement with a single tooth 14 carried by a disc 14' which disc at its under side is provided with a bevel gear 15. The disc 14' is driven by a shaft 16 which is connected with the main drive of any conventional speedometer.

Mounted upon suitable supports 151 and 152 within the housing and paralleling the recorder cage is a shaft 17 carrying a bevel pinion 18 having driving engagement with the aforementioned bevel pinion 15. This shaft is hollow, as will be seen by reference to Figure 3, and is longitudinally slotted as at 19 for a distance equal to the over-all length of all of the movable indicators carried by the cage. A ring-like member 20 surrounds this shaft and is adapted to travel longitudinally thereof. This member is provided with an outwardly extending actuating finger 21 and an inwardly extending fin or boss 22 which moves in the aforementioned slot 19.

Extending longitudinally within the hollow shaft 17 is a second shaft 23 which extends outwardly beyond the left end of the exterior shaft through bearing 153 and has driving connection as at 24 with a shaft 25 which in turn is connected with the speed indicator of any conventional vehicle speedometer. The shaft 23 is a worm shaft and actuates a worm nut 26 which nut in turn engages a suitable recess 27 provided in the fin or lug 22. The worm nut is prevented from rotating by a rod 28 supported by bearing 153 with the result that as the shaft 17 rotates the member 20 carrying the finger 21 will likewise rotate and when the shaft 23 oscillates the worm nut 26 will progress back and forth along the shaft and move the ring 20 and its actuating finger 21 longitudinally of the outer shaft 17 and longitudinally in respect to the cage. The particular position of the ring 20 and its finger will of course be dependent upon the speed of the vehicle because the shaft 23 which operates the longitudinal movement of the finger is actuated by the speed indicating portion of the speedometer. In other words, if the speed indicator of the speedometer moves up to 40 miles per hour the ring 20 will be moved along the shaft 17 to a point opposite that vertical row of indicators carrying the 40 mile designation and as the shaft 17 is rotated by the main shaft of the speedometer the finger will engage the extending leg 7 of one of the indicators and move the indicator up into the position illustrated in Figure 1 of the drawings at A. The numeral face of the indicator will then be in a position to be visible through the window 29 which is provided in the casing or housing 9. As long as the vehicle is moving both the cage and the indicator operating finger will be rotated. By utilizing a single tooth for the drive of the cage the device can be designed in such a manner that one revolution of the disc 14' and the advancement of rotation of the cage one increment will occur during the travel of the vehicle through a predetermined distance, as for instance one hundred feet. The disc 14' is provided with calibrations 30 indicating distances up to one hundred feet with the result that any time the vehicle is stopped it can be determined how far the vehicle has traveled since the last engagement between the tooth 14 and the gear 13 carried by the cage.

Assuming that one hundred feet distance were determined upon between engagement of the tooth 14 with the gear 13, then each of the actuated indicators or records A carried by the cage would indicate a like distance, that is to say, a row of horizontal indicators would pass a given point every one hundred feet. Assuming the recorder is to record the speed over a predetermined distance of two miles, a sufficient number of horizontal rows of indicators would be provided to take care of that distance.

The result of the foregoing is that with a vehicle starting from a given point and traveling two miles, the speed of the vehicle throughout all portions of said travel would be recorded or indicated by the indicators carried by the rotating cage. If the vehicle did not exceed forty miles per hour during the travel of that distance none of the indicators beyond the vertical row of indicators carrying the forty mile per hour indicating numerals would be actuated by the finger 21. Upon opening the casing and removing the cage at the end of the two mile run a record would be at hand for determining the speed of the vehicle throughout its entire travel by an inspection of the cage to determine which particular indicators had been actuated. The indicators which had been actuated would record the speed or speeds.

Inasmuch as the device is for the purpose of continuously and progressively recording the speed of the vehicle, it is necessary to progressively clear the recorder and this is accomplished by the provision within the cage of an arm or rod 31 which as the cage rotates will engage the legs 32 of those indicators which have been actuated and return them, progressively, to their original and initial positions. This clearing of the record by engagement of the indicator legs with the rod 31 takes place just before the indicators again reach the finger 21, that is, just before a horizontal row of indicators has made a complete revolution.

Figures 4 to 6 of the drawings indicate a modified form of accomplishing the same result just immediately hereinbefore described in respect to the first three figures of the drawings, but this form of the invention falls under the second classification because the cage is continuously rotated. It will be seen that in this instance there is the same housing 9 provided with the door 10 secured by a seal 12. The cage is indicated at 33 and has end and carrier discs 34 and 35 and is made up of a plurality of ovate shaped longitudinally extending rods 35' arranged in separated parallel relationship and upon which are supported the L-shaped or right angle-like indicators B. In this instance the normal position of these indicators is that their blank faces 36 face outwardly and in reality comprise the outer face of the cage while the other legs 37 of the indicators extend inwardly and carry the speed designations, as clearly appears in Figure 4 of the drawings. Thus, normally before any of the speed indicators have been actuated no speed designations are visible through the glass window 29 of the housing 9.

Just as in respect to the previously described form of the invention these indicators are provided with springs 5 for normally maintaining the indicators in their proper positions but permitting the indicators to flop around ninety degrees upon being slightly moved.

The carrier 34 of the cage carries a bevel gear 38 having driving connection with a bevel gear 39 carried by a shaft 40 which is connected with the main shaft of a conventional speedometer. Just as in respect to the heretofore described form of the invention it is intended that one row of horizontal indicators will pass a given point during each hundred feet of travel of the vehicle. This is accomplished of course by the use of proper gears in the drive.

Extending longitudinally through the center of the cage there is an oscillatory worm shaft 41 carrying on its outer end a bevel gear 42 having driving connection with a bevel gear 43 carried by a shaft 44 which is connected with the speed indicator of a conventional vehicle speedometer. Shaft 41 carries a worm nut 45 provided with an outwardly extending finger 46. The nut is prevented from turning on the worm shaft through the instrumentality of an angle shaped bar or rod 47 supported in the bearings.

In view of the description given in respect to the first form of the invention it will be understood that the position of the nut 45 and its actuating finger 46 on the shaft 41 will be determined by the speed of the vehicle and as the cage rotates about the shaft 41 and the finger 46 this finger will engage the inwardly extending legs 37 of the indicators and cause them to flop over, as is clearly pictured in Figure 4 of the drawings. When one of the indicators has been moved by the finger the leg 37 bearing the speed indication will then be outward and be visible through the window 29 of the housing.

Just as in respect to the preferred form of the invention the cage can at any time be removed and will bear a recording indicating the speed of the vehicle throughout its travel. The result of this is that should a law enforcement officer observe a car being driven obviously at an excessive speed he has merely to stop the car and examine the record carried by the cage. This record will show speed of travel of the vehicle for every hundred feet through the last two miles of travel of the vehicle. Should the driver deny the violation the officer would break the seal, remove the cage for use as evidence at the trial or the hearing. After the case was settled the cage would be replaced and resealed by an authorized officer. It is of course contemplated that law would be provided which would render a driver liable to fine in the event his recording speedometer was not operating accurately at all times.

Just as in respect to the first described form of the invention, it is necessary to progressively clear the record carried by the cage and this is accomplished by the rod 48 which will progressively clear the longitudinal rows of indicators just before they again reach the finger 46.

To assure that the cage is replaced in the proper position on its supporting member, the cage and supporting member are provided with flattened portions 49 as indicated in Figure 5 of the drawings.

Figure 7 falls in the first classification and illustrates a further modification of that form of the invention wherein the cage is rotated intermittently. The speed indicators are actuated electrically through the medium of solenoids.

In this form of the invention the carrier is indicated at 100 and the disc at 101. A series of ovate rods arranged in separated parallel relationship to form the cage extend from the carrier to the disc and upon these are mounted the speed indicators X. These speed indicators are of angular form, as has been previously described, and are positioned upon the rods in the manner illustrated and described in respect to the form appearing in Figure 4 of the drawings. That is to say, the inwardly extending leg 102 of the indicator carries the numeral indicating the particular speed. Just as in the other forms of the invention these indicators are arranged in horizontal and vertical rows with each indicator in a particular vertical row carrying the same speed indication.

The cage which is designated by the numeral 103, through its supporting attachment with the carrier 100 is rotated periodically in intervals. This rotation is accomplished through a shaft 104 which is connected with the main shaft of an ordinary vehicle speedometer. This shaft carries a disc 105 provided with a single tooth 106 which engages a gear 107 carried on the outer end of the carrier 100. Thus the carrier and cage will be rotated so that one horizontal row of indicators will pass a given point upon each revolution of the shaft driven disc 105. Each advancement of the cage will represent one hundred feet of travel of the vehicle and any fractional distance of such travel can be ascertained by examining the scale or calibration 108 carried by the disc 105.

The indicators X are actuated by a series of solenoids Y. One solenoid is provided for each vertical row of indicators and these solenoids are placed internally of the cage and supported from the bearings 4' and 4² by a bar 155 or the like. It will be apparent, as illustrated in Figure 7, that when a solenoid plunger 109 is extended it will engage the inwardly extending leg 102 of a speed indicator and cause it to be moved about the rod upon which it is supported so that the speed designating numeral upon the indicator will face outwardly in respect to the cage and will be visible. It is of course intended that this cage be mounted within a housing provided with a window, as has been described in respect to the other forms of the invention. It will also be understood that the cage is removable from its housing or container for use as proof in the manner heretofore described in respect to the other forms of the invention.

A plate 110 is provided with a series of contacts or segments 111. There is one contact for each of the solenoids and each solenoid is connected to its respective and proper contact. The particular wires indicating the connection between each individual solenoid and its proper contact are designated at 112. A pointer 113 is mounted on the plate for oscillation. This pointer is adapted to pass over and make contact with any individual segment 111. This pointer is connected with the speed indicator of a conventional motor vehicle speedometer so that as the speedometer indicator oscillates so in similar manner will the pointer 113 oscillate. When the speedometer needle or indicator is on a forty mile designation the pointer 113 will be on the forty mile segment or contact 111. A wire 114 leaps from the pointer to a battery 115. One wire 116 leads from the battery and has contact with each of the solenoids Y. A second wire 117 leads from the battery and has its end 119 adapted to contact the segmental blocks or electrical contact members 120 carried at the inner face of the carrier 100. This segmental block has one electrical contact corresponding to each tooth in the gear 107 with the result that as the carrier and cage are periodically advanced the contact between the end 119 of the wire 117 and the segmental contactor 120 will be periodically broken. A wire 121 leads from the segmental block 120 and has contact with each individual solenoid through a series of connecting wires 122. The electrical connection between the wire 121 and each individual solenoid is normally open as each wire 122 is broken as at 123. The armatures or fingers 109 of the solenoids are normally held withdrawn from possible contact with any speed indicator by springs 124.

With the construction and mechanism thus far described it will be seen that when the electrical circuit is closed corresponding to some designated speed, as for instance forty miles per hour as illustrated in Figure 7 of the drawings, the armature for that vertical row of indicators carrying the forty mile per hour designation is projected outwardly and will engage and operate an indicator carrying a forty mile per hour designation. When the armature is projected it closes contact across the open wire ends 123 of the line 122 and closes the circuit to the battery. The result of this is that the armature remains in its extended position even though the pointer 13 may move to a different mileage segment contact due to the change of speed of the vehicle. The closed circuit goes through the segmental block 120 and the circuit through the particular solenoid will not be broken until the cage has been advanced one tooth or one increment due to a complete revolution of the shaft driven disc 105. Immediately upon advancement of the cage and its carrier the circuit is broken and opened through all of the extended solenoids so that any one of them which may have been actuated will return to its original position through the operation of its particular spring 124.

When the cage advances one increment all projecting armatures will actuate the corresponding speed indicator and thus a complete record of all speeds obtained during the particular distance traveled is recorded. The speed indicators are pregressively cleared or returned to their original positions through engagement with a rod 125 arranged in the path of travel of one leg of any speed indicator which may have been actuated. This rod is attached to the recorder housing or casing, it being understood of course that such a housing is provided as has been explained in respect to the other forms of the invention.

Figure 8 which falls in the second classification in that the cage is continuously rotated, is a slight modification of that form of the invention appearing in Figure 7 of the drawings which has just been described and differs from that appearing in Figure 7 in two respects, namely, that the cage is constantly rotated rather than periodically advanced, and that the segmental block 120 is eliminated with the result that the plungers of the solenoids will remain extended only so long as the circuit is actually closed by reason of the pointer 113 being actually in engagement with one of the contact blocks 111 mounted on the plate 110. The solenoids R in this form of the invention are normally withdrawn and are only projected and only remain projected as long as the contact with the particular solenoid is closed through its respective contact member on the plate 110.

The cage is driven through a shaft 130 which is connected with the main shaft of a conventional vehicle speedometer and the rotation of the cage is continual as long as the vehicle is moving.

The wires 117 and 121 as well as the wires 122 appearing in the Figure 7 form of the invention have been eliminated in this particular form of the invention. Inasmuch as the remaining structure of the device is similar to that appearing in Figure 7 no further description of this form of the invention is considered necessary as like parts are designated by the same reference numerals used in respect to the Figure 7 form of the invention.

While the device has been referred to, for convenience, as a recording device in the above description and as being operable to record the speed of travel of the vehicle at predetermined intervals throughout a predetermined elapsed distance travelled by the vehicle, such expressions are not intended to be construed in any manner as a limitation of the invention, and the invention might well be termed an indicating device inasmuch as the record is not a permanent one, but exists only during a certain distance travelled by the vehicle, and the indicators carried by the cylinder are moved to bring the legends thereon into and out of exposed position in a manner somewhat analogous to the legend bearing indicators operated by cash registers and like devices. That is, the record or indication is maintained until the commencement of the succeeding period or operation.

I claim:

1. An indicating speedometer for vehicles and the like, comprising a cylinder, a plurality of indicating devices movably mounted upon said cylinder, said indicating devices being provided with legends for indicating different speeds of travel of the vehicle and being normally arranged on said cylinder with said legends concealed, and being movable to bring said legends into exposed position, motion transmitting means between the vehicle and said cylinder to effect rotation of said cylinder in proportion to the distance traveled by the vehicle, and means controlled by the rate of speed of the vehicle and being operable to effect operation of said indicating devices to bring said legends into exposed position and establish an indication of the speed of travel of the vehicle throughout a predetermined distance of travel, and means subsequently cooperable with said indicating devices to move the same with the legends in concealed position and clear said indication.

2. In an indicating speedometer for vehicles and the like, comprising a cylinder, a plurality of rows of indicating devices arranged on said cylinder, said indicating devices being provided with numerals progressing from one end of each row to the other end, said indicating devices in each row being normally arranged with said numerals concealed, actuating means arranged in juxtaposition to said cylinder and being cooperable with said indicating devices to effect movement of said devices and bring the numerals thereon into exposed position, motion transmitting means between the vehicle and said cylinder and operable to effect rotation of the same to bring one row of indicating devices into juxtaposition to said actuating means when the vehicle has traveled a predetermined distance, and means controlled by the speed of travel of the vehicle to actuate said actuating means along said row of indicating devices in proportion to the speed of travel of the vehicle.

3. In an indicating speedometer for vehicles and the like comprising a cylinder, a plurality of rows of indicating devices extending axially of the cylinder, said indicating devices being arranged on the cylinder with the indications thereon concealed and being movable to bring the indications into exposed position, a tripping member arranged in juxtaposition to the cylinder and arranged to coact with said indicating devices upon rotary movement of the cylinder to bring the indications on said devices into exposed position, means controlled by the speed of travel of the vehicle and operable to move said tripping device axially of the cylinder in proportion to the speed of travel of the vehicle, and motion transmitting means operable to intermittently rotate said cylinder to bring a row of said indicating devices into operative position with said tripping device when the vehicle has traveled a predetermined elapsed distance.

4. An improved indicating speedometer for use in connection with a vehicle comprising a revolvable cylinder, speed indicators carried by said cylinder and adapted to record the speed of said vehicle at predetermined intervals throughout a predetermined distance of travel, said cylinder being driven by the movement of said vehicle and adapted to be rotated intermittently upon the completion of travel of said vehicle over each of a series of lesser predetermined distances which total the first mentioned greater predetermined distance, and means responsive to the speed of the vehicle for indicating on the cylinder through said indicators the speed of said vehicle during each of said lesser distances of travel of said vehicle.

5. A construction as defined in claim 4 wherein a calibrating device is provided for indicating the distance of travel of the vehicle between movements of the cylinder.

6. An improved indicating speedometer for use in connection with a vehicle comprising an indicator carrying member, a plurality of series of indicators carried by said member, the indicators of each series being individually shiftable and indicating, when shifted, a certain speed of the vehicle, means operable to shift said indicators in proportion to the speed of the vehicle, and means operable by movement of the vehicle to effect relative movement between said series carrying member and said shifting means to successively position each of said series in cooperative relationship to said indicator shifting means during travel of the vehicle over a predetermined distance.

7. An improved indicating speedometer for use in connection with a vehicle comprising a movable member, a plurality of series of indicators carried by said member, the indicators of each series being individually shiftable to indicate a certain speed of the vehicle, means operable to shift said indicators in proportion to the speed of the vehicle, and means operable by movement of the vehicle to move said movable member to successively position each of said series in operative relationship to said indicator shifting means during travel of the vehicle over a predetermined distance.

8. An improved indicating speedometer for use in connection with a vehicle comprising an indicator carrying member, a plurality of series of indicators carried by said member, the indicators of each series being individually shiftable and indicating, when shifted, a certain speed of the vehicle, means operable to shift said indicators in proportion to the speed of the vehicle, and means operable by movement of the vehicle to effect relative movement between said series carrying member and said shifting means to successively position each of said series in cooperative relationship to said indicator shifting means and to maintain said series in such cooperative relationship during travel of the vehicle over a predetermined distance.

9. An improved indicating speedometer for use in connection with a vehicle comprising a movable member, a plurality of series of indicators carried by said member, the indicators of each series being individually shiftable to indicate the speed of the vehicle, means operable to shift said indicators in proportion to the speed of the vehicle, and means operable by movement of the vehicle to move said movable member to successively position each of said series in operative relationship to said indicator shifting means during travel of the vehicle over a predetermined distance, and means operable to reshift said indicators of one series to non-indicating position during movement of another series into such operative relationship.

10. An improved indicating speedometer for use in connection with a vehicle comprising an indicator carrying member, a plurality of series of indicators carried by said member, indicator shifting means operable in proportion to the speed of the vehicle to shift one or more of the indicators in each series from non-indicating position to indicating position to indicate one or more speeds of the vehicle during travel of the vehicle while said series is in cooperative relationship with said indicator shifting means, and means operable by movement of the vehicle to effect relative movement between said indicator carrying member and said shifting means to successively position each of said series in cooperative relationship to said indicator shifting means during travel of the vehicle over a predetermined distance.

11. In an indicating speedometer for vehicles and the like comprising a cylinder, a plurality of axially extending rows of indicating devices arranged on said cylinder, and each said devices being provided with a numeral, with the numerals progressing along each row of said devices, an electro-responsive tripping device arranged to engage each indicating device and being operable when energized to move said indicating device relative to the cylinder and bring the numerals on said device into exposed position, motion transmitting means between said cylinder and the vehicle for intermittently rotating the cylinder to bring a row of said indicating devices into juxtaposition to said tripping devices, and means controlled by the speed of travel of the vehicle and operable to energize said tripping devices according to the speed of travel of the vehicle.

12. An improved indicating speedometer for use in connection with a vehicle comprising a rotatable cylinder operable by the movement of the vehicle, speed indicators carried by said cylinder and adapted to record the speed of travel of said vehicle throughout only a predetermined distance of travel of the vehicle, electrically actuated means responsive to the speed of the vehicle and being cooperable with the indicators for indicating the speed of said vehicle on said cylinder indicators, and means for continuously and progressively clearing said indicators, whereby the indication at all times indicates the speed of travel of the vehicle throughout the elapsed portion of travel of the vehicle through said predetermined distance.

ARTHUR AYLING BLUE.